July 8, 1969  E. B. WAGNER  3,454,125
EXTERNAL DIFFERENTIAL LOCKUP
Filed Aug. 17, 1967
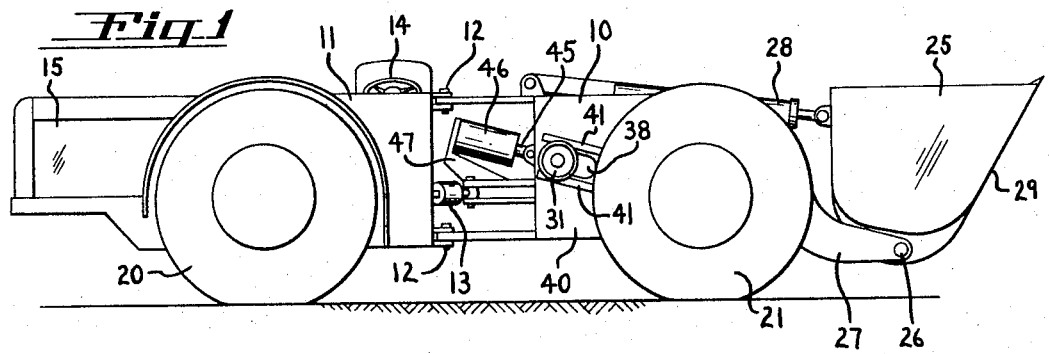
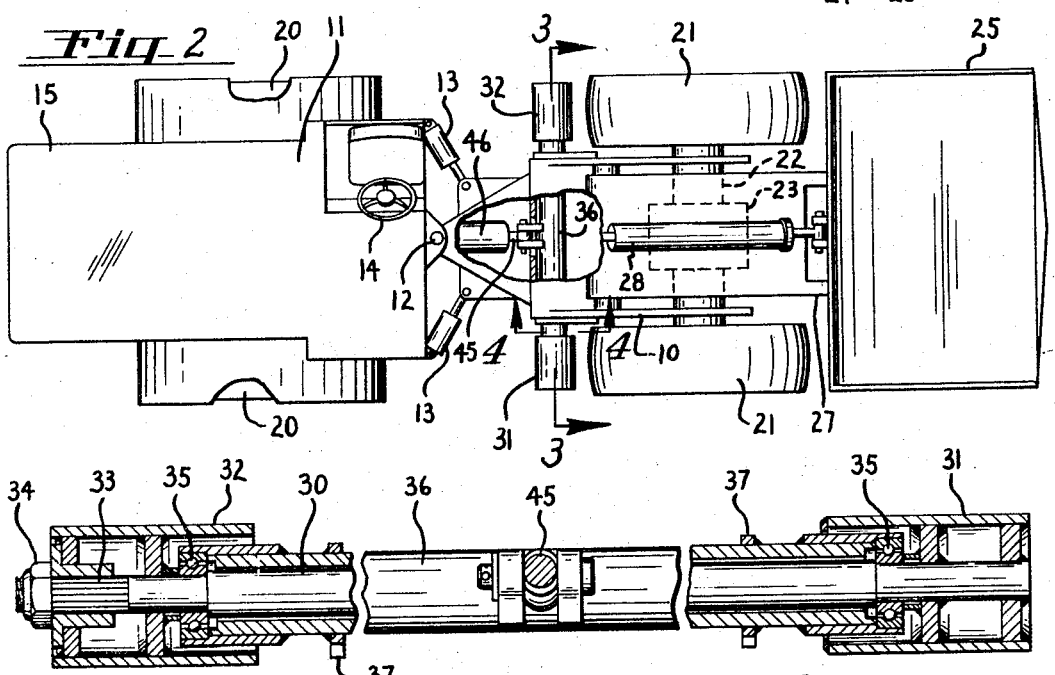
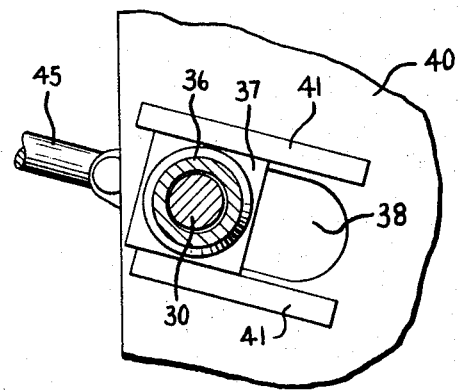
INVENTOR.
EDDIE B. WAGNER
BY
Attorney

United States Patent Office 3,454,125
Patented July 8, 1969

3,454,125
EXTERNAL DIFFERENTIAL LOCKUP
Eddie B. Wagner, Portland, Oreg., assignor to Wagner Mining Scoop, Inc., Portland, Oreg., a corporation of Oregon
Filed Aug. 17, 1967, Ser. No. 661,446
Int. Cl. B60k 25/08; B62d 9/00; E02f 3/76
U.S. Cl. 180—74      3 Claims

ABSTRACT OF THE DISCLOSURE

A device for locking a vehicle differential temporarily so that when one wheel on a dirve axle loses traction it cannot spin and reduce the torque applied to the other wheel. The device comprises a transverse idler shaft having a pair of rollers fixedly mounted on its opposite ends arranged to be pressed against the tires on the two wheels to prevent one wheel from rotating faster than the other wheel.

Background of the invention

This invention relates to a device for temporarily locking a vehicle differential to prevent one wheel on a drive axle from spinning freely when it loses traction.

In any vehicle driving through a differential, a wheel losing traction on the ground will tend to spin. When this occurs, relatively little torque is supplied to the other wheel on the axle. This is objectionable to some extent in any vehicle because it causes the vehicle to become stalled when one of a pair of driving wheels loses its traction to a greater extent than the other wheel, as for example on ice or loose gravel.

Wheel spin is particularly objectionable in a loader vehicle having a bucket which requires the maximum tractive effort of the vehicle wheels to fill the bucket by a scooping movement into a pile of material. Any reduction in the thrusting force makes it impossible to fill the bucket. When a loader vehicle has a relatively stiff suspension, objectionable wheel spin may occur merely as a result of one wheel dropping into a depression in the ground whereupon that wheel does not bear its share of weight of the vehicle.

Special nonslip differentials have heretofore been developed to overcome the wheel spin problem but they are relatively complicated and expenesive and are not well suited for heavy machinery. It is desired to provide a device which may be applied temporarily only when it is needed, permitting the conventional differential to operate in the normal manner at all other times.

Summary of the, invention

The present device comprises merely a pair of rollers fixedly mounted on the opposite ends of a transverse idler shaft. The shaft is mounted for movement toward and away from the driving wheels of the vehicle. The shaft is moved by a hydraulic cylinder which holds the rollers against the vehicle tires when differential lockup is desired and retracts the rollers away from the tires when normal differential action is desired. When the rollers are pressed into firm engagement with the tires, any tendency toward wheel spin on one side of the vehicle is prevented by the shaft and rollers which have the effect of gearing the two wheels together so that one cannot turn faster than the other. The two wheels rotate in unison as though fixed to a solid axle having no differential.

Objects of the invention are to provide a device for effecting temporary lockup of a vehicle differential, to provide a differential lockup which may be rendered inoperative when it is not needed, to provide a device of the type described which may be applied exteriorly to the tires of any vehicle having a conventional differential and to provide a device which is relatively simple and inexpensive to manufacture yet which is rugged and reliable in operation.

The invention will be better understood and additional objects and advantages will become apparent from the following description of the preferred embodiment shown on the accompanying drawing. Various changes may be made, however, in the details of construction and arrangement of parts and certain features may be used without others. All such modifications within the scope of the appended claims are included in the invention.

Brief description of the drawing

FIGURE 1 is a side elevation of a loader vehicle embodying the principles of the invention;
FIGURE 2 is a top plan view;
FIGURE 3 is an enlarged view on the line 3—3 in FIGURE 2 with parts broken away; and
FIGURE 4 is an enlarged view on the line 4—4 in FIGURE 2.

Description of the preferred embodiment

A loader vehicle is illustrated by way of example. The vehicle has a front body section 10 and a rear body section 11 pivotally connected together by vertical pins at 12 for steering. A pair of hydraulic cylinder and piston units 13 are connected between the two body units to swing the two body units relative to each other in turning. Cylinder and piston units 13 are controlled in the usual manner by a steering wheel 14.

The vehicle is driven by an engine 15 through a transmission. Rear body section 11 is supported on a pair of rear wheels 20, preferably having a differential axle which is driven by a drive shaft from the transmission. Front body section 10 is supported on a pair of front wheels 21 on a differential axle, also driven by a drive shaft from the transmission. This axle and differential are indicated generally at 22 and 23 in FIGURE 2. This driving arrangement provides a four wheel drive but the invention is also applicable to a two wheel drive vehicle wherein only the wheels 21 are driven. All four wheels are equipped with pneumatic rubber tires.

A loader bucket 25 is pivotally mounted at 26 on the end of a forwardly extending boom 27 which may be raised and lowered by hydraulic cylinders, not shown. Bucket 25, which is shown in upright load-carrying position, may be tilted forward on pivot 26 to a sufficient angle for dumping and to a lesser angle for scooping by means of hydraulic cylinder and piston unit 28. In scooping position the front wall 29 of the bucket is inclined slightly downward so as to be thrust into a pile of material by the tractive effort exerted by the wheels of the vehicle. When the bucket has been filled in this manner, it is tilted back to its upright carrying position shown in FIGURE 1 for transportation to a dumping point. The structure thus far described is typical of a conventional loader.

In attempting to thrust the lip of the bucket into a pile of material in the manner described, it frequently happens that one of the front wheels 21 will encounter loose gravel or drop into a depression, causing that wheel to lose traction. When this occurs, the differential 23 permits the wheel to spin, causing relatively little torque to be transmitted to the other wheel 21 which has better traction. If the rear wheels 20 are nondriving wheels, the vehicle has thereby lost substantially all its traction and cannot thrust the bucket into the pile. Substantially the same result occurs even when the rear wheels 20 are also driving wheels. In such case, the vehicle has lost about half its tractive effort which so reduces the thrust on the bucket that the bucket cannot be properly filled. Moreover, in many driving systems for such vehicles there is a third differential between the front and rear axles whereby loss of traction of any one wheel very seriously impairs the tractive effort of the other three. In such case, even the rear wheels 20 are of little assistance and the vehicle becomes stalled in forward movement.

The device of the present invention comprises a transverse idler shaft 30 having rollers 31 and 32 fixedly mounted on its opposite ends as shown in FIGURE 3. Roller 31 is shown welded to the shaft and, for convenience in assembly, roller 32 is detachably mounted on splines 33 and secured by a nut 34. Thus, the two rollers 31 and 32 cannot rotate relative to each other. The surfaces of the rollers preferably have a corrugated tread to provide good tractive engagement with the tires on wheels 21.

Shaft 30 is mounted for rotation in bearing 35 in the ends of a supporting tube 36. Welded on tube 36 is a pair of slides 37. The end portions of tube 36 extend through slots 38 in vertical side frame members 40 of the front body section 10, the two slides 37 supporting the tube for sliding movement in guides 41 above and below each slot 38. These slots and guides are directed radially to driving axle 22.

Tube 36 is reciprocated in slots 38 by a piston rod 45 in a double acting hydraulic cylinder 46, the latter being mounted on a bracket 47 on front body section 10. A manual valve at the operator's station permits hydraulic fluid to be introduced into the head end of cylinder 46 for pressing the rollers 31 and 32 against the tread surfaces of the tires on wheels 21. When the valve is released, it is spring-actuated to a reverse position directing hydraulic pressure into the rod end of cylinder 46 to retract the rollers 31 and 32 as shown in FIGURES 1 and 2.

When a wheel spin condition is encountered, the operator manipulates the valve as described to introduce fluid pressure into the head end of cylinder 46, causing rollers 31 and 32 to be pressed against the tires on wheels 21 with considerable force. This has the effect of locking the differential 23 by gearing the two wheels 21 to each other through shaft 30. Driving torque is thereby maintained on the wheel having good traction causing the vehicle to move forward and pass over the spot where poor traction was encountered.

The device not only prevents loss of traction on the nonspinning front wheel 21 but if there is a third differential between the front and rear axles, the device also prevents loss of traction on rear wheels 20 whereby the resulting thrust on the bucket is the same as if the vehicle had no differentials whatever. When the operator releases the control valve, the rollers 31 and 32 are returned to their retracted position shown in FIGURES 1 and 2, restoring differential 23 to its normal function.

Having now described my invention and in what manner the same may be used, what I claim as new and desire to protect by Letters Patent is:

1. A temporary external remote controlled differential lockup device for a vehicle having a differential driving axle with rubber tired wheels on opposite sides of the vehicle, comprising a transverse tube, a shaft journaled in said tube, a pair of rollers fixedly mounted on opposite ends of said shaft for engagement with said tires to gear the two wheels together through said shaft so that one wheel cannot rotate relative to the other wheel, side plates on said vehicle having guide slots therein supporting said tube for sliding movement toward and away from said wheels, and a fluid pressure cylinder and piston unit connected to a central portion of said tube for imparting said sliding movement.

2. A temporary external remote controlled differential lockup device for a vehicle having a differential driving axle with rubber tired wheels on opposite sides of the vehicle, comprising a transverse tube, a shaft journaled in said tube, a pair of rollers fixedly mounted on opposite ends of said shaft for engagement with said tires to gear the two wheels together through said shaft so that one wheel cannot rotate relative to the other wheel, side plates on opposite sides of said vehicle having guide slots therein approximately radial to said driving axle supporting the ends of said tube for sliding movement toward and away from said wheels, a piston rod connected to a central portion of said tube, and a double acting fluid pressure cylinder containing said piston rod and aligned with said guide slots for imparting said sliding movement in opposite directions under the control of the operator of the vehicle.

3. A device as defined in claim 2 including a pair of guides extending along opposite sides of each of said guide slots, and slides on said tube movable in said guides.

References Cited

UNITED STATES PATENTS 3,194,337    7/1965    Parks _____ 180—74
3,246,778    4/1966    Kampert et al.

FOREIGN PATENTS 73,943    10/1960    France.

HUGO O. SCHULZ, *Primary Examiner.*

U.S. Cl. X.R.

180—51; 214—131, 778